US011973904B2

(12) United States Patent
Sakaguchi et al.

(10) Patent No.: US 11,973,904 B2
(45) Date of Patent: Apr. 30, 2024

(54) SIGNAL PROCESSING DEVICE, IMAGING DEVICE, READING DEVICE, IMAGE FORMING DEVICE, AND SIGNAL PROCESSING METHOD

(71) Applicants: Shinji Sakaguchi, Kanagawa (JP); Tohru Kanno, Kanagawa (JP); Masamoto Nakazawa, Kanagawa (JP)

(72) Inventors: Shinji Sakaguchi, Kanagawa (JP); Tohru Kanno, Kanagawa (JP); Masamoto Nakazawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/749,146

(22) Filed: May 20, 2022

(65) Prior Publication Data

US 2022/0279079 A1    Sep. 1, 2022

Related U.S. Application Data

(63) Continuation of application No. PCT/JP2020/042869, filed on Nov. 17, 2020.

(30) Foreign Application Priority Data

Nov. 25, 2019    (JP) .................. 2019-212732

(51) Int. Cl.
*G06K 15/00*    (2006.01)
*H04N 1/00*    (2006.01)
*H04N 1/32*    (2006.01)

(52) U.S. Cl.
CPC ..... *H04N 1/00236* (2013.01); *H04N 1/32368* (2013.01)

(58) Field of Classification Search
CPC ........... H04N 1/00236; H04N 1/32368; H04N 1/32374
See application file for complete search history.

(56) References Cited

U.S. PATENT DOCUMENTS

2002/0036805 A1    3/2002  Kanno et al.
2005/0088550 A1*   4/2005  Mitsunaga ........... H04N 25/135
                                                  348/E9.01
(Continued)

FOREIGN PATENT DOCUMENTS

CN    103312992 A    9/2013
CN    104429057 A    3/2015
(Continued)

OTHER PUBLICATIONS

International Search Report dated Feb. 25, 2021 in PCT/JP2020/042869 filed Nov. 17, 2020, 8 pages.

(Continued)

*Primary Examiner* — Moustapha Diaby
(74) *Attorney, Agent, or Firm* — XSENSUS LLP

(57) ABSTRACT

A signal processing device includes a data writing unit, a channel number converting unit, and a plurality of serial data transferring unit. The data writing unit is configured to write data of m channels into a memory. The channel number converting unit is configured to output the data read from the memory as data of n channels, where m is larger than n. The plurality of serial data transferring unit is configured to transfer the data of the n channels to a processing device in a subsequent stage.

12 Claims, 11 Drawing Sheets

(56) References Cited

U.S. PATENT DOCUMENTS

| | | |
|---|---|---|
| 2008/0068467 A1 | 3/2008 | Kanno |
| 2008/0068683 A1 | 3/2008 | Kanno |
| 2009/0244303 A1 | 10/2009 | Kinoshita et al. |
| 2010/0309319 A1 | 12/2010 | Yanada et al. |
| 2011/0051201 A1 | 3/2011 | Hashimoto et al. |
| 2011/0205398 A1 | 8/2011 | Hatano |
| 2013/0242154 A1 | 9/2013 | Kobayashi et al. |
| 2015/0163403 A1 | 6/2015 | Wakabayashi |
| 2017/0094113 A1* | 3/2017 | Togashi .................. H04N 1/03 |
| 2017/0171482 A1 | 6/2017 | Wakabayashi |
| 2018/0084212 A1 | 3/2018 | Wakabayashi |
| 2018/0309903 A1 | 10/2018 | Togashi |
| 2018/0332188 A1* | 11/2018 | Shimizu .................. H04N 1/58 |
| 2020/0007765 A1 | 1/2020 | Wakabayashi |
| 2020/0053233 A1* | 2/2020 | Nakazawa ......... H04N 1/00798 |
| 2021/0149607 A1 | 5/2021 | Satsuka |

FOREIGN PATENT DOCUMENTS

| | | |
|---|---|---|
| EP | 2053847 A1 | 4/2009 |
| JP | 2008-078796 | 4/2008 |
| JP | 2011-041200 | 2/2011 |
| JP | 2017-063299 A | 3/2017 |
| JP | 2021-082952 | 5/2021 |

OTHER PUBLICATIONS

Chinese Office Action dated Aug. 17, 2023, in corresponding Chinese Application No. 202080081530.7, 25pp.

* cited by examiner

SIGNAL PROCESSING DEVICE, IMAGING DEVICE, READING DEVICE, IMAGE FORMING DEVICE, AND SIGNAL PROCESSING METHOD

CROSS-REFERENCE TO RELATED APPLICATIONS

The present application is a continuation application of International Application No. PCT/JP2020/042869, filed Nov. 17, 2020, which claims priority to Japanese Patent Application No. 2019-212732, filed Jan. 25, 2019. The contents of these applications are incorporated herein by reference in their entirety.

BACKGROUND OF THE INVENTION

1. Field of the Invention

The present invention relates to a signal processing device, an imaging device, a reading device, an image forming device, and a signal processing method.

2. Description of the Related Art

A conventionally known imaging device including a solid-state imaging element has a three-line sensor structure including RGB pixels or a four-line sensor structure capable of reading invisible light such as infrared light in addition to visible light such as RGB.

On the other hand, Japanese Laid-open Patent Publication No. 2017-063299 discloses a technique of reducing data transfer speed. In this technique, an image readout signal is converted into digital data, speed conversion is performed using a RAM (random access memory), and then, the data is transferred with LVDS (Low Voltage Differential Signaling).

In the conventional four-line sensor, however, it is considered that the image data for four colors is transferred as image signals to a signal processing IC in a subsequent stage through a dedicated transmission line, and when there are many IF signals between a sensor IC and the signal processing IC, restriction occurs in mounting the ICs, which is a problem.

In addition, in order to handle the image data with four colors, simply, it is only necessary to increase the number of systems. In Japanese Laid-open Patent Publication No. 2017-063299, six systems are used. However, to handle the image data of RGB*10 bits, providing five systems of LVDS data lanes at minimum is enough; therefore, even in a case of handling three or more colors, it is desirable that all the data can be transferred in the five systems. Moreover, increasing the number of lanes results in the restriction when the IC is mounted, which is a problem.

SUMMARY OF THE INVENTION

According to one aspect of the present invention, a signal processing device includes a data writing unit, a channel number converting unit, and a plurality of serial data transferring unit. The data writing unit is configured to write data of m channels into a memory. The channel number converting unit is configured to output the data read from the memory as data of n channels, where m is larger than n. The plurality of serial data transferring unit is configured to transfer the data of the n channels to a processing device in a subsequent stage.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
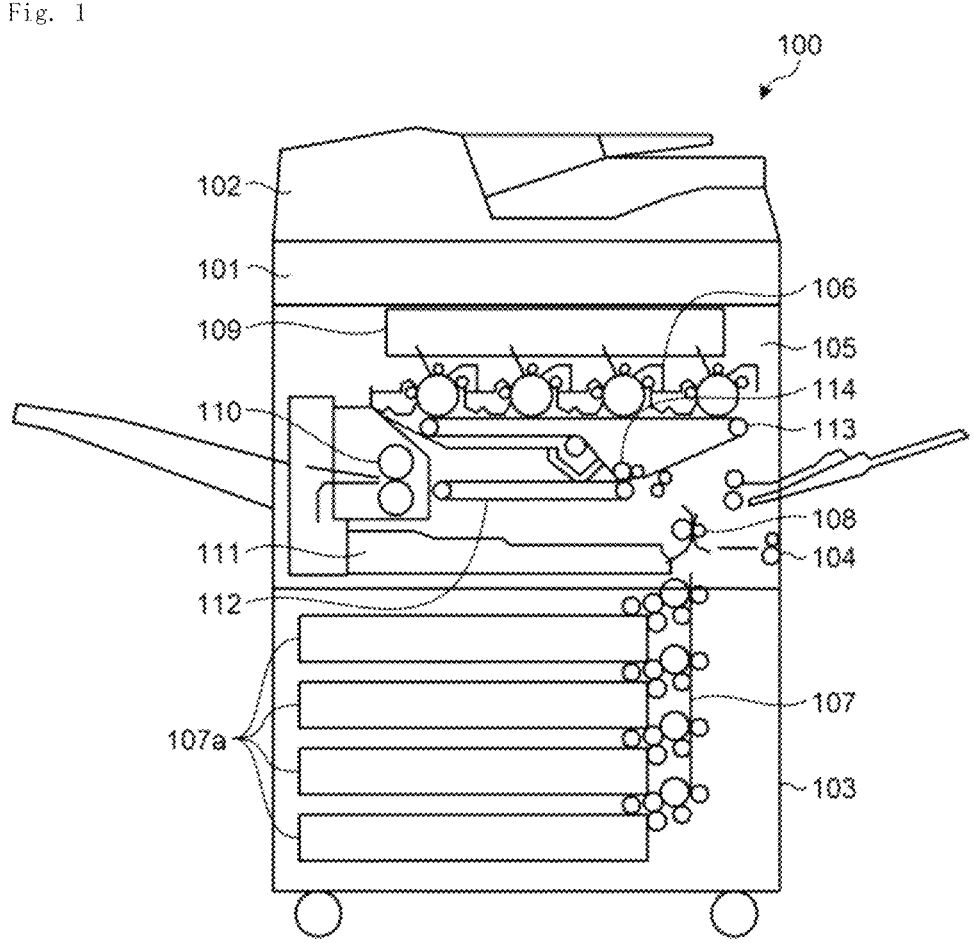
FIG. 1 is a diagram illustrating a structure of one example of an image forming device according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment has an object to transfer data at low cost without increasing the number of lanes.

Embodiments of a signal processing device, an imaging device, a reading device, an image forming device, and a signal processing method are hereinafter described in detail with reference to the accompanying drawings.

First Embodiment

FIG. 1 is a diagram illustrating a structure of one example of an image forming device 100 according to a first embodiment. In FIG. 1, the image forming device 100 is a generally called multifunction peripheral having at least two functions among a copying function, a printer function, a scanner function, and a facsimile function.

The image forming device 100 includes an image reading device 101, which is a reading device, and an ADF (Automatic Document Feeder) 102, and also includes an image forming unit 103 below them. As for the image forming unit 103, an internal structure with an external cover detached therefrom is illustrated in order to describe the internal structure.

The ADF 102 is a document supporting unit that positions a document containing an image to be read at a reading position. The ADF 102 automatically conveys the document on a mount table to the reading position. The image reading device 101 reads the document conveyed by the ADF 102 at the predetermined reading position. In addition, the image reading device 101 includes a contact glass, which is the document supporting unit to have the document thereon, on an upper surface thereof, and reads the document on the contact glass corresponding to the reading position. Specifically, the image reading device 101 is a scanner including a light source, an optical system, and a solid-state imaging element such as a CMOS image sensor inside. The image reading device 101 reads the reflection light from the document illuminated with the light source using the solid-state imaging element through the optical system.

The image forming unit 103 includes a manual paper feeding roller 104 to which recording paper is fed by hand, and a recording paper supplying unit 107 that supplies the recording paper. The recording paper supplying unit 107 has a mechanism that feeds the recording paper from a recording paper feeding cassette 107a with multiple stages. The supplied recording paper is sent to a secondary transfer belt 112 through a registration roller 108.

On the recording paper conveyed on the secondary transfer belt 112, a toner image on an intermediate transfer belt 113 is transferred at a transfer unit 114.

In addition, the image forming unit 103 includes an optical writing device 109, a tandem system image forming unit (Y, M, C, K) 105, the intermediate transfer belt 113, the aforementioned secondary transfer belt 112, and the like. Through the image formation process by the image forming unit 105, the image written by the optical writing device 109 can be formed on the intermediate transfer belt 113 as the toner image.

Specifically, the image forming unit (Y, M, C, K) 105 includes four photoconductor drums (Y, M, C, K) in a manner that the photoconductor drums are rotatable. Around each photoconductor drum, an image forming element 106 is provided. The image forming element 106 includes a charging roller, a developing device, a primary transfer roller, a cleaner unit, and a static eliminator. In each photoconductor drum, the image forming element 106 functions and the image on the photoconductor drum is transferred onto the intermediate transfer belt 113 by each primary transfer roller.

The intermediate transfer belt 113 is disposed at a nip between each photoconductor drum and each primary transfer roller with a tension applied by a driving roller and a driven roller. The toner image that is transferred by the primary transfer to the intermediate transfer belt 113 is transferred by the secondary transfer onto the recording paper on the secondary transfer belt 112 by a secondary transfer device as the intermediate transfer belt 113 runs. The recording paper is conveyed to a fixing device 110 as the secondary transfer belt 112 runs, and the toner image is fixed on the recording paper as a color image. After that, the recording paper is discharged to a paper ejection tray outside the machine. In a case of duplex printing, the recording paper is turned over by an inverting mechanism 111 and the inverted recording paper is sent onto the secondary transfer belt 112.

Note that the image forming unit 103 is not limited to forming the image by an electrophotography method as described above, and may form the image by an inkjet method.

Next, the image reading device 101 is described.

Figure 2:
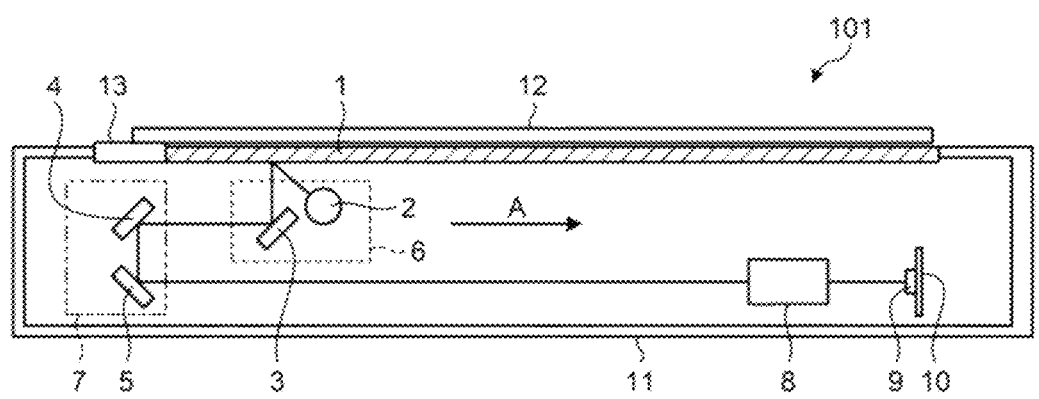
FIG. 2 is a cross-sectional view illustrating an example of a structure of an image reading device.

FIG. 2 is a cross-sectional view illustrating an example of a structure of the image reading device 101. As illustrated in FIG. 2, the image reading device 101 includes a sensor board 10 including an imaging device 9, a lens unit 8, a first carriage 6, and a second carriage 7 inside a main body 11. The first carriage 6 includes a light source 2, which is an LED (Light-Emitting Diode), and a mirror 3. The second carriage 7 includes mirrors 4 and 5. The image reading device 101 also has a contact glass 1 and a reference white board 13 on an upper surface thereof.

In the reading operation, the image reading device 101 causes the light source 2 to emit light upward while moving the first carriage 6 and the second carriage 7 from a standby position (home position) in a sub-scanning direction (A-direction). Then, the first carriage 6 and the second carriage 7 form an image with the reflection light from a document 12 on the imaging device 9 through the lens unit 8.

The image reading device 101 sets the reference by reading the reflection light from the reference white board 13 when the power is turned on, for example. That is to say, the image reading device 101 moves the first carriage 6 right below the reference white board 13, turns on the light source 2, and causes the reflection light from the reference white board 13 to form the image on the imaging device 9; thus, gain control is performed.

In the imaging device 9 (see FIG. 4), pixels for converting the quantity of incident light into electric signals are arranged. The pixels are arranged in matrix, and the electric signals obtained from the pixels are transferred to a signal processing unit 21 (see FIG. 4) in a subsequent stage in a predetermined order for every certain time (pixel readout signals). On each pixel, a filter that transmits light with a particular wavelength is disposed. In the imaging device 9 according to the present embodiment, each signal obtained from the pixel group where the same filter is disposed is called a channel.

Figure 3:
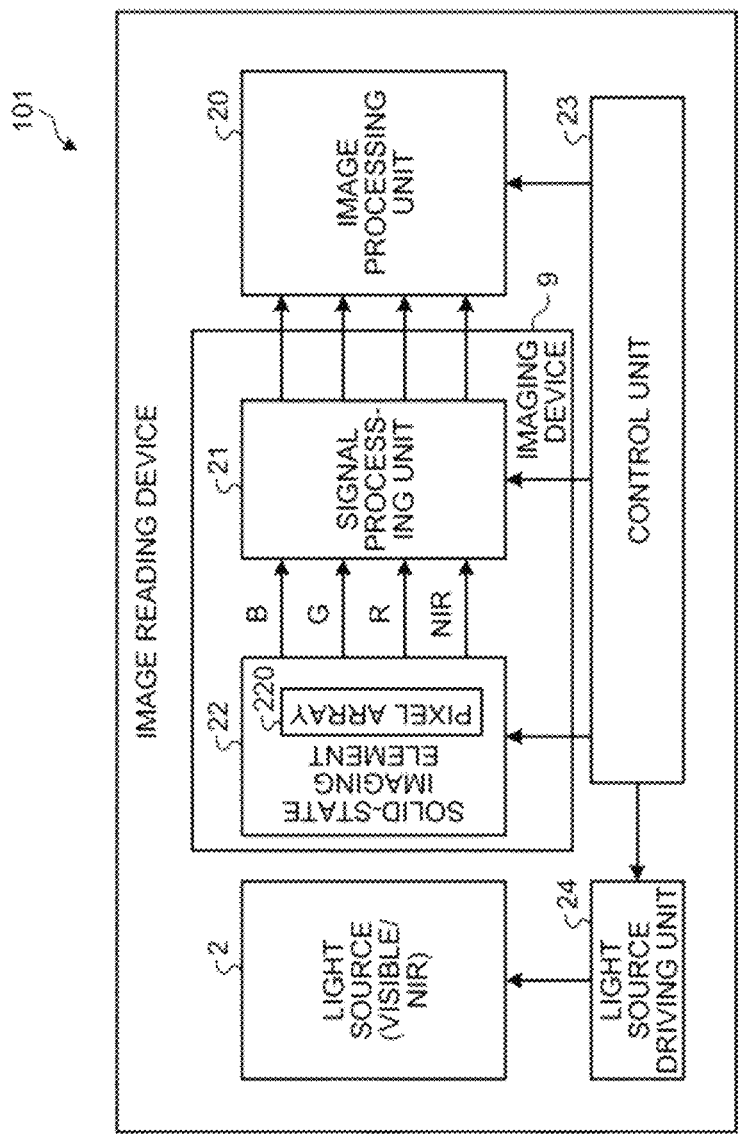
FIG. 3 is a block diagram illustrating electric connection of each unit in the image reading device.

FIG. 3 is a block diagram illustrating electric connection of each unit in the image reading device 101. As illustrated in FIG. 3, the image reading device 101 includes an image processing unit 20, a control unit 23, and a light source driving unit 24 in addition to the imaging device 9 and the light source 2 described above. The light source driving unit 24 drives the light source 2.

The imaging device 9 includes a solid-state imaging element 22 and the signal processing unit 21 corresponding to a signal processing device. The solid-state imaging element 22 is a sensor for a reduction optical system, and for example, a CMOS image sensor or the like. The solid-state imaging element 22 includes a pixel array 220. The pixel array 220 includes a number of photodiodes (PDs) arranged in matrix to form the pixels, and transfers photoelectric conversion results to the signal processing unit 21 in the subsequent stage in a predetermined order.

The signal processing unit 21 includes a gain control unit (amplifier), an offset control unit, an A/D conversion unit (ADC circuit), and the like. The signal processing unit 21 performs gain control, offset control, A/D conversion, and the like for the image signals (R/G/B/NIR) output from the solid-state imaging element 22.

The control unit 23 controls the setting of each unit of the light source driving unit 24, the solid-state imaging element 22, the signal processing unit 21, and the image processing unit 20.

The image processing unit 20 performs various image processes.

Next, a circuit structure of each of the signal processing unit 21 and the image processing unit 20 is described in detail.

Figure 4:
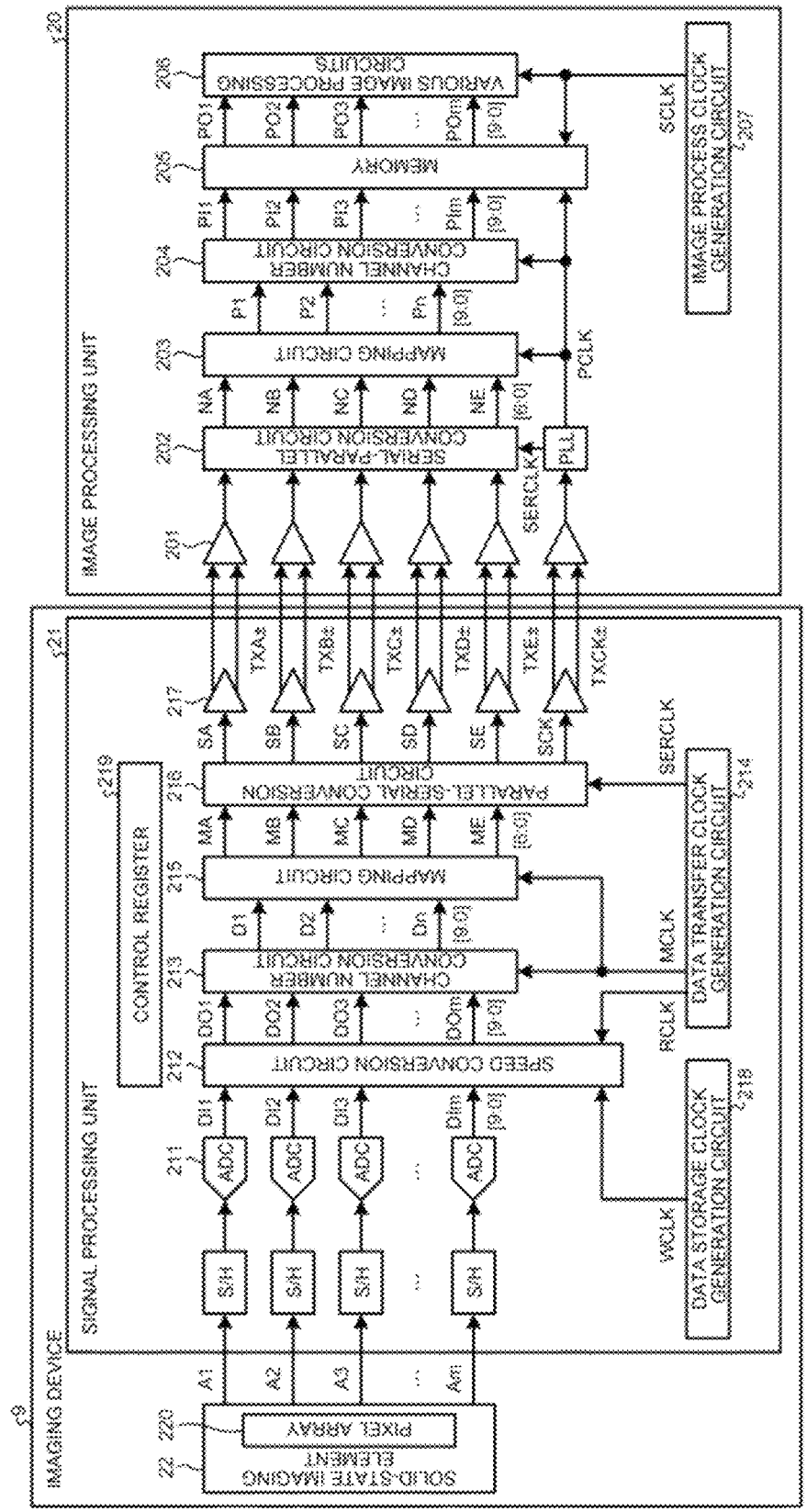
FIG. 4 is a diagram illustrating a circuit structure example of the signal processing unit and the image processing unit in the image reading device.

Here, FIG. 4 is a diagram illustrating a circuit structure example of the signal processing unit 21 and the image processing unit 20 in the image reading device 101.

In the present embodiment, each of m and n is an integer of 1 or more satisfying m>n. In the description of the present embodiment, the image data acquired by the solid-state imaging element 22 is processed; however, the signal processing device with the structure according to the present invention is not limited to the case of handling the image data only.

As illustrated in FIG. 4, the signal processing unit 21 includes ADC circuits 211, a speed conversion circuit 212 corresponding to a data writing unit and a speed converting unit, a channel number conversion circuit 213 corresponding to a channel number converting unit, a data transfer clock generation circuit 214, a mapping circuit 215, a parallel-serial circuit 216, a data transfer circuit 217, a data storage clock generation circuit 218, a control register 219, and the like. The control register 219 stores various settings therein through the control unit 23.

As illustrated in FIG. 4, in the signal processing unit 21, the ADC circuits 211 convert pixel readout signals (A1 to Am) obtained for every channel from the solid-state imaging element 22 into digital data (DI1 to DIm) with 10 bits. The DI1 to DIm signals resulting from the conversion are written in the speed conversion circuit 212 in synchronization with a speed conversion circuit writing clock (WCLK) with the same frequency as a pixel readout frequency. Note that WCLK is generated by the data storage clock generation circuit 218.

The data written in the memory of the speed conversion circuit 212 is read out in synchronization with a speed conversion circuit readout clock (RCLK). Note that RCLK is generated by a data transfer clock generation circuit 214 that generates a data transfer clock (SERCLK).

The data (DO1 to DOm) of m channels and 10 bits that is read from the memory in the speed conversion circuit 212 is converted into data of n channels (D1 to Dn) with 10 bits that synchronizes with MCLK by the channel number conversion circuit 213. Note that MCLK is generated by the data transfer clock generation circuit 214 that generates the data transfer clock (SERCLK).

Figure 5:
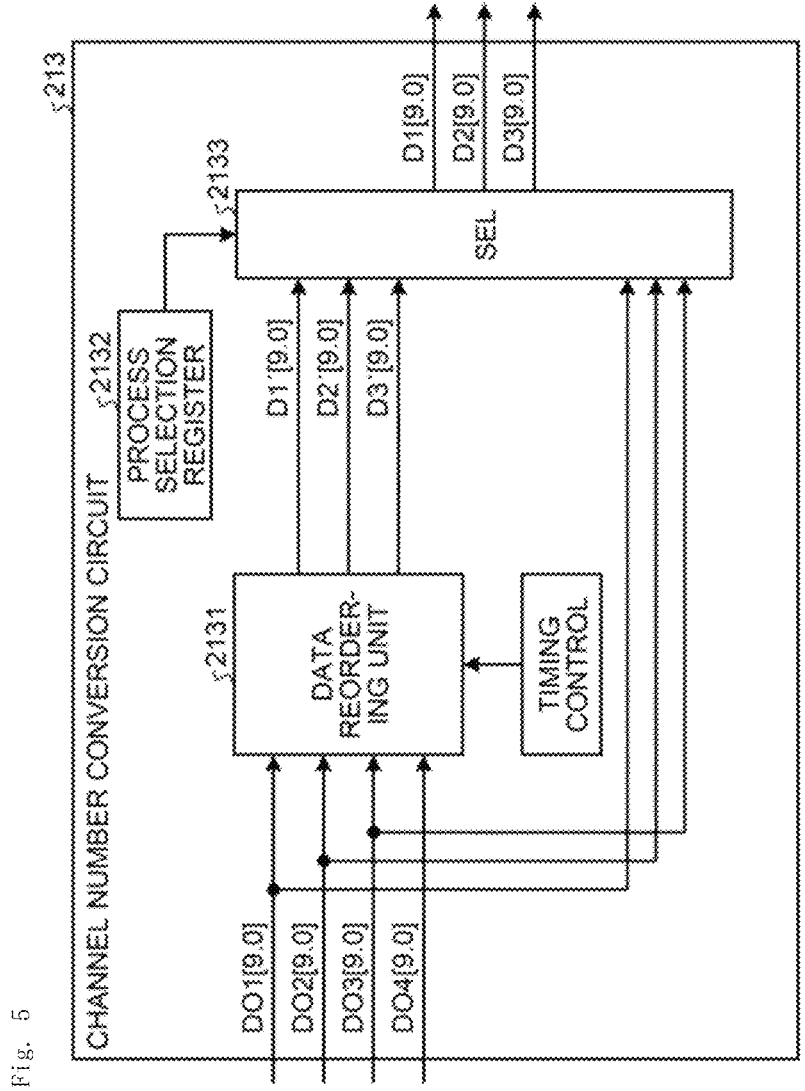
FIG. 5 is a diagram illustrating one example of a structure of a channel number conversion circuit included in the signal processing unit.

Here, the channel number conversion circuit 213 included in the signal processing unit 21 is described in detail. FIG. 5 is a diagram illustrating one example of a structure of the channel number conversion circuit 213 included in the signal processing unit 21. Here, m is four and n is three. As illustrated in FIG. 5, the channel number conversion circuit 213 includes a data reordering unit 2131, a process selection register 2132, and a selector 2133. In the channel number conversion circuit 213, the data reordering unit 2131 reorders the four-channel image data (DO1 to DO4) read out from the speed conversion circuit 212 to generate the three-channel image data (D1 to D3).

The selector 2133 selectively outputs the three-channel image data (D1 to D3) to be output to the subsequent stage by the control through the process selection register 2132.

Note that the channel number conversion circuit 213 may have a function of selecting a part of the multiple-channel image data that is input and outputs the selected image data without reordering the data. For example, in a case where just the predetermined three-channel image data (DO1 to DO3) is required in the image processing unit 20, the predetermined three-channel image data may be output by bypassing the data reordering unit 2131 as illustrated in FIG. 5. Thus, just by the setting of the process selection register 2132, the three-channel or four-channel image data transfer switching becomes possible in one device without the necessity of changing the circuits or switching the transmission line.

The data (D1 to Dn) converted by the channel number conversion circuit 213 is transferred to the image processing unit 20 through the mapping circuit 215, the parallel-serial circuit 216, and the data transfer circuit 217 in the subsequent stage. The mapping circuit 215 performs a mapping process on the data (D1 to Dn) converted by the channel number conversion circuit 213, and for example, obtains five systems of MA to ME signals with 7 bits. The parallel-serial circuit 216 performs parallel-serial conversion on the MA to ME signals, and obtains SA to SE signals synchronizing with the SERCLK signal. Moreover, the image processing unit 20 generates a transfer data synchronizing clock SCK for carrying out the serial-parallel conversion. Therefore, the channel number conversion circuit 213, the mapping circuit 215, the parallel-serial circuit 216, and the data transfer circuit 217 achieve a data transferring unit.

On the other hand, as illustrated in FIG. 4, the image processing unit 20 includes a data transfer circuit 201, a serial-parallel circuit 202, a mapping circuit 203, a channel number conversion circuit 204, a memory 205, various image processing circuits 206, an image process clock generation circuit 207, and the like.

As illustrated in FIG. 4, in the image processing unit 20, the channel number conversion circuit 204 converts the data of n channels and 10 bits, which has been transmitted through the serial-parallel circuit 202 and the mapping circuit 203 in the subsequent stage, into data of m channels and 10 bits (PI1 to PIm) and writes the data into the memory 205 that is provided for the m channels using the clock (PCLK) synchronizing with the clock that is transferred together with the data through the data transfer circuit 201. The process in the various image processing circuits 206 after the memory is read out in the image processing unit 20 is performed in synchronization with the clock (SCLK) generated by the image process clock generation circuit 207.

Note that in the subsequent description, as one example, the number of channels m of input data from the solid-state imaging element 22 is four and the number of channels n of data transfer is three. Note that m is not limited to four and n is not limited to three.

Figure 6:
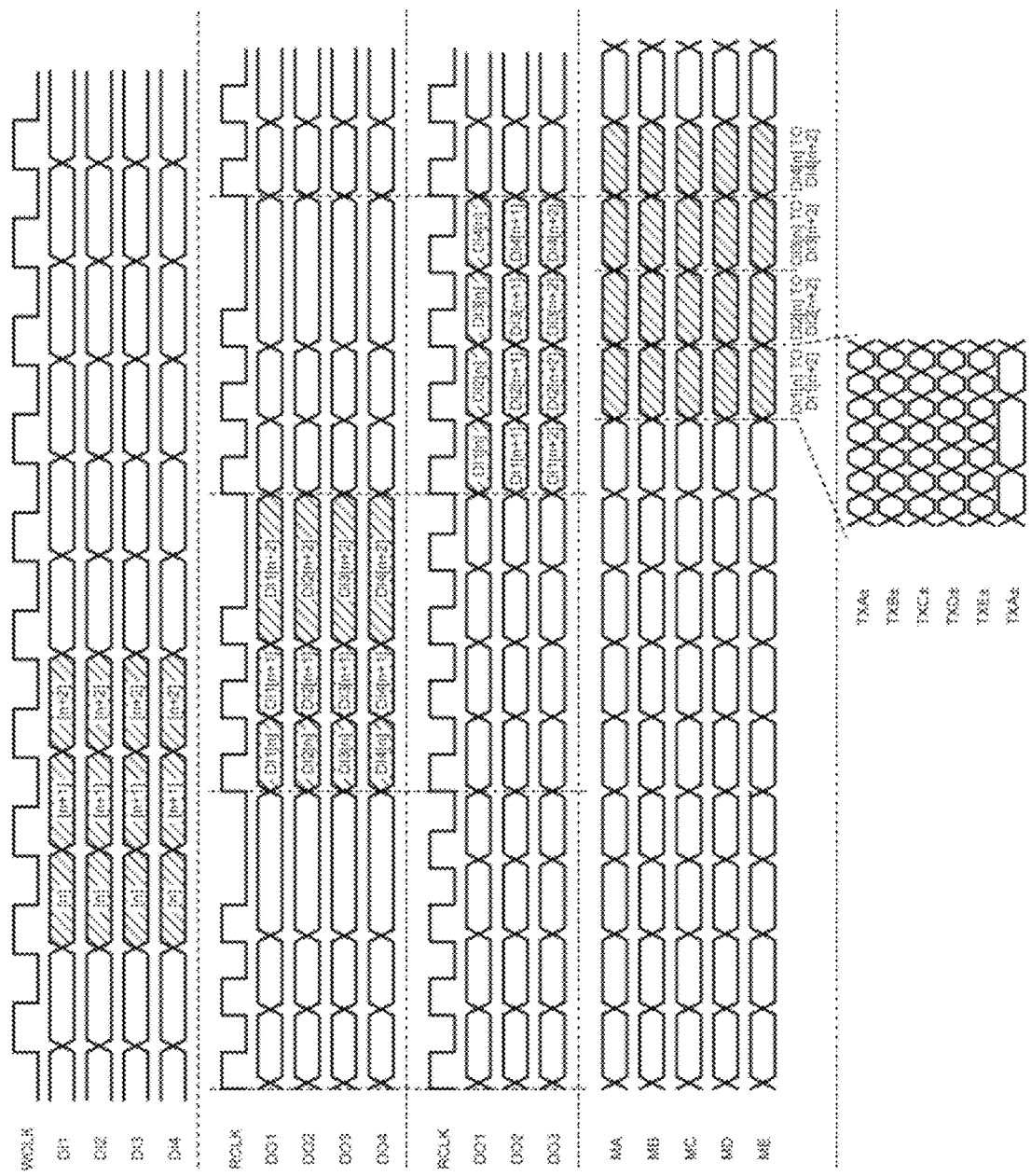
FIG. 6 is a timing chart illustrating one example of a data process in the signal processing unit.

Next, the data process in the signal processing unit 21 is described in detail. Here, FIG. 6 is a timing chart illustrating one example of the data process in the signal processing unit 21. In the example illustrated in FIG. 6, the four-channel image data is processed in the signal processing unit 21.

Note that in FIG. 6, the details ranging from the output of the solid-state imaging element 22 to the process of generating the digital data by the ADC circuit 211 are omitted.

As illustrated in FIG. 6, the output (DI1 to DI4) from the ADC circuit 211 is written in the speed conversion circuit 212 in synchronization with WCLK. The image data readout from the speed conversion circuit 212 is performed in synchronization with the clock RCLK different from WCLK. When the frequency of writing in and reading from the speed conversion circuit 212 is the same, the readout from the speed conversion circuit 212 overtakes the writing in the speed conversion circuit 212. Thus, it is necessary to write in the speed conversion circuit 212 in advance, and a large-scaled speed conversion circuit is mounted. The clock generation circuit (data storage clock generation circuit 218) for writing in the speed conversion circuit 212 and the clock generation circuit (data transfer clock generation circuit 214) for reading from the speed conversion circuit 212 are provided separately, so that the frequencies of WCLK, and RCLK and MCLK are made independently controllable by the control unit 23 as appropriate, which is described below. Thus, the circuit scale of the speed conversion circuit 212 that is necessary in the present invention can be minimized.

As illustrated in FIG. 6, the frequencies of WCLK, and RCLK and MCLK are made independently controllable by the control unit 23, so that the data transfer speed can be set as appropriate regardless of the number of image data channels to handle.

That is to say, the clock generation circuit (data storage clock generation circuit 218) for writing in the speed conversion circuit 212 and the clock generation circuit (data transfer clock generation circuit 214) for reading from the speed conversion circuit 212 are provided separately, so that the speed of reading from the speed conversion circuit 212 can be made higher than the speed of writing in the speed conversion circuit 212 and thus, the number of channels can be reduced. In the case of generating the writing and reading clocks in one clock generation circuit, the readout is late and therefore, many memory circuits are required.

In the example of converting the image data for four channels illustrated in FIG. 6 into three channels, the data for three channels that is transferred per clock MCLK is the data for three pixels obtained from one desired channel among the four-channel image data that is input to the channel number conversion circuit 213. Thus, in all the data transfer periods, the data to transfer is selected without the transfer of the invalid image data; therefore, the invalid pixel data is not multiplied in the entire clocks and all the necessary data can be transferred with the minimum clocks. Note that in the case of transferring the data for every two pixels in one clock MCLK, for example, the loss for one pixel occurs in every clock.

Note that, in the timing chart in FIG. 6, the signal processing unit 21 controls RCLK used to read from the speed conversion circuit 212 such that the frequency of RCLK is equal to the frequency of MCLK but only three pulses are generated among four pulses. It is only necessary that RCLK can read out at such a speed that the speed difference between writing and reading can be absorbed, and for example, the clock with the frequency equal to the frequency of WCLK synchronizing with MCLK may be used.

In a case where the number of channels m of the input data from the solid-state imaging element 22 is four and the number of channels n of the data transfer is three, MCLK is generated in the clock generation circuit (data transfer clock generation circuit 214) that is different from the clock generation circuit (data storage clock generation circuit 218) that generates WCLK. The frequency of MCLK is 4/3 times (m/n times) the frequency of WCLK. When the frequency of MCLK is 4/3 times the frequency of WCLK, the writing bit rate and the reading bit rate become equal and the number of stages in the memory (circuit scale) of the speed conversion circuit can be reduced. Thus, the writing in the speed conversion circuit 212, the reading from the speed conversion circuit 212, and the data transfer can be performed efficiently and the size of the speed conversion circuit 212 can be minimized.

In the signal processing unit 21 where the speed conversion circuit 212 with a large scale can be mounted, the frequency ratio between MCLK and WCLK may be set freely. For example, the frequency of MCLK may be equal to or more than 4/3 times the frequency of WCLK. By causing the data transfer frequency to be higher in this manner, the data transfer can be performed in a short time. When the frequency of MCLK is equal to or more than 4/3 times (m/n times) the frequency of WCLK, the power consumption can be reduced by turning off the data transfer circuit 217 in the case where the data transfer is not performed (except the valid data transfer period), for example. Even in the case of processing the different number of channels m, the data transfer frequency can be unified and the transmission route design or the noise countermeasure component can be made common.

Moreover, the frequency of MCLK may be equal to or less than 4/3 times (m/n times) the frequency of WCLK. In this case, the data transfer frequency can be reduced. The high transfer frequency results in the electromagnetic noise (EMI noise) in the transmission route, the deterioration in transmission signal quality, or the increase in consumption power; therefore, causing the frequency of MCLK to be equal to or less than 4/3 times the frequency of WCLK is effective to suppress these problems. Even in the case of processing the different number of channels m, the data transfer frequency can be unified and the transmission route design or the noise countermeasure component can be made common.

In the case of transferring the image data for four channels or three channels in the signal processing unit 21 with the structure that can process the image data for four channels, the control unit 23 may control so that the transfer frequency becomes equal regardless of the number of channels included in the data to transfer. That is to say, the data transfer frequency is made the same at the four-color data transfer and the three-color data transfer.

In other words, when the digital data with different numbers of channels m1 and m2 as the digital data of m channels is converted into the data of n channels, the speed conversion circuit readout frequency is controlled to be the same. Thus, since the data transfer frequency can be set to be a constant frequency regardless of the number of image channels m to handle, it is possible to handle the reflection or the dull shape of waveform to be considered in the design of the transmission line in consideration of just the limited frequency. It is only necessary that the EMI countermeasure components and the like are applicable to just a particular frequency and the number of steps in the design and the mount cost can be reduced.

Next, the data process in the image processing unit 20 is described in detail.

Figure 7:
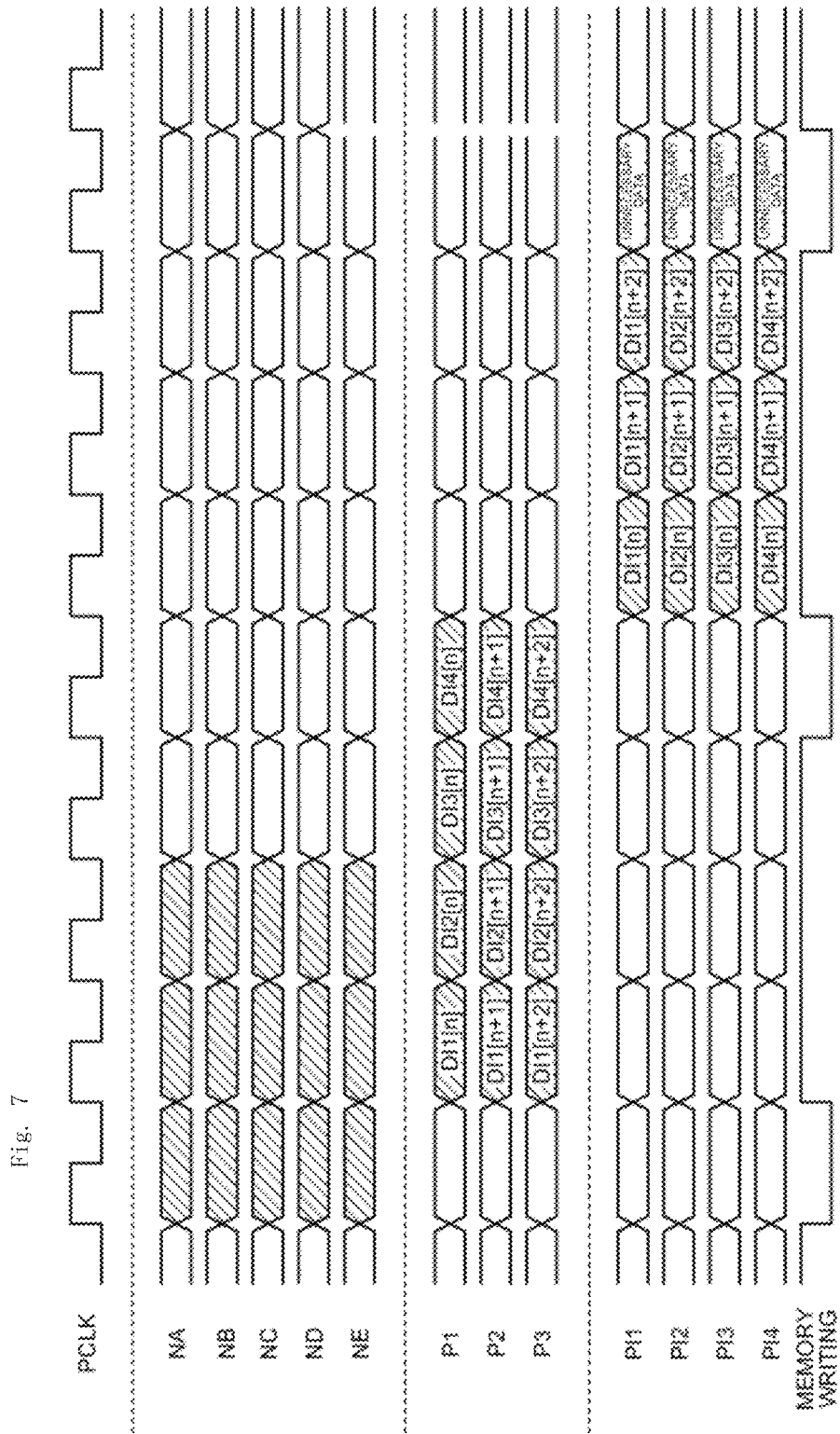
FIG. 7 is a timing chart illustrating one example of the data process in the image processing unit.

Here, FIG. 7 is a timing chart illustrating one example of the data process in the image processing unit 20. In the example illustrated in FIG. 7, the image data for four channels is processed in the image processing unit 20.

As illustrated in FIG. 7, in the image processing unit 20, the serial-parallel circuit 202 performs serial-parallel conversion on the signal that is transferred through the data transfer circuit 201, and then the mapping circuit 203 performs a process opposite to the mapping performed in the signal processing unit 21; thus, signals with three channels P1 to P3 with 10 bits are obtained. The image data formed of P1 to P3 is converted into signals with four channels by the channel number conversion circuit 204. The data is reordered to become opposite to the order obtained at the channel number conversion in the signal processing unit 21.

As illustrated in FIG. 7, the image data for four channels includes one unnecessary image data among four data and the unnecessary image data is not written in the memory 205. The image data read from the memory 205 does not include the unnecessary image data, and the image data for four channels obtained in the signal processing unit 21 is demodulated directly.

In the present embodiment, the number of channels m of the input data is four and the number of channels n of the data transfer is three. Specifically, in another possible structure of each channel, the input channels may be the image data for three colors of visible light R/G/B and the image data obtained from invisible light such as near-infrared light (NIR). In this case, if the invisible light image is required, the number of input channels is four and if not required, the number of input channels is three. According to the structure in the present embodiment, for the data transfer from the signal processing unit 21 to the image processing unit 20, the data transfer lanes for three channels may be provided regardless of whether the invisible light image needs to be acquired.

According to the present embodiment, the solid-state imaging element 22 transfers the image data for m channels to the image processing unit 20 through the data transfer circuit 217 for n channels, so that the data transfer becomes possible with the same circuit structure as that in transfer of the data of n channels. Therefore, it is unnecessary to provide another transmission route for transferring the data of m channels and the additional increase of the mount area or components can be prevented. Accordingly, the number of lanes is not increased and the data can be transferred at low cost.

Since the on-board structure that is necessary for the data transfer is the same regardless of the readout channel, the imaging device capable of the image data transfer in a manner that the readout of the visible light (three colors of RGB) and readout of the image by lighting the visible light and the invisible light at the same time (RGB+NIR) are performed in one circuit structure can be achieved.

Moreover, for example, even an imaging device reads the visible light and the invisible light (m-color reading device), when the imaging device that does not require the invisible image information, changing to the data transfer speed equivalent to in the n-color reading device can be made by only setting; thus, the consumption can be reduced.

In the present embodiment, the data transfer circuits 217 and 201 between the signal processing unit 21 and the image processing unit 20 are not limited to particular circuits; however, the data transfer may be performed using a low-amplitude differential signal outputting unit such as LVDS (Low Voltage Differential Signaling) or VbyOne (registered trademark). By employing the differential signal output as above, the noise resistance is improved and thus, it is effective when the data transfer frequency is high and the long-distance transmission is performed.

Second Embodiment

Next, a second embodiment is described.

The signal processing unit 21 in the image reading device 101 according to the second embodiment is different from that in the first embodiment in that the number of channels for writing in the speed conversion circuit 212 is restricted. In the second embodiment, the description of the same part as in the first embodiment is omitted and the point different from the first embodiment is described.

Figure 8:
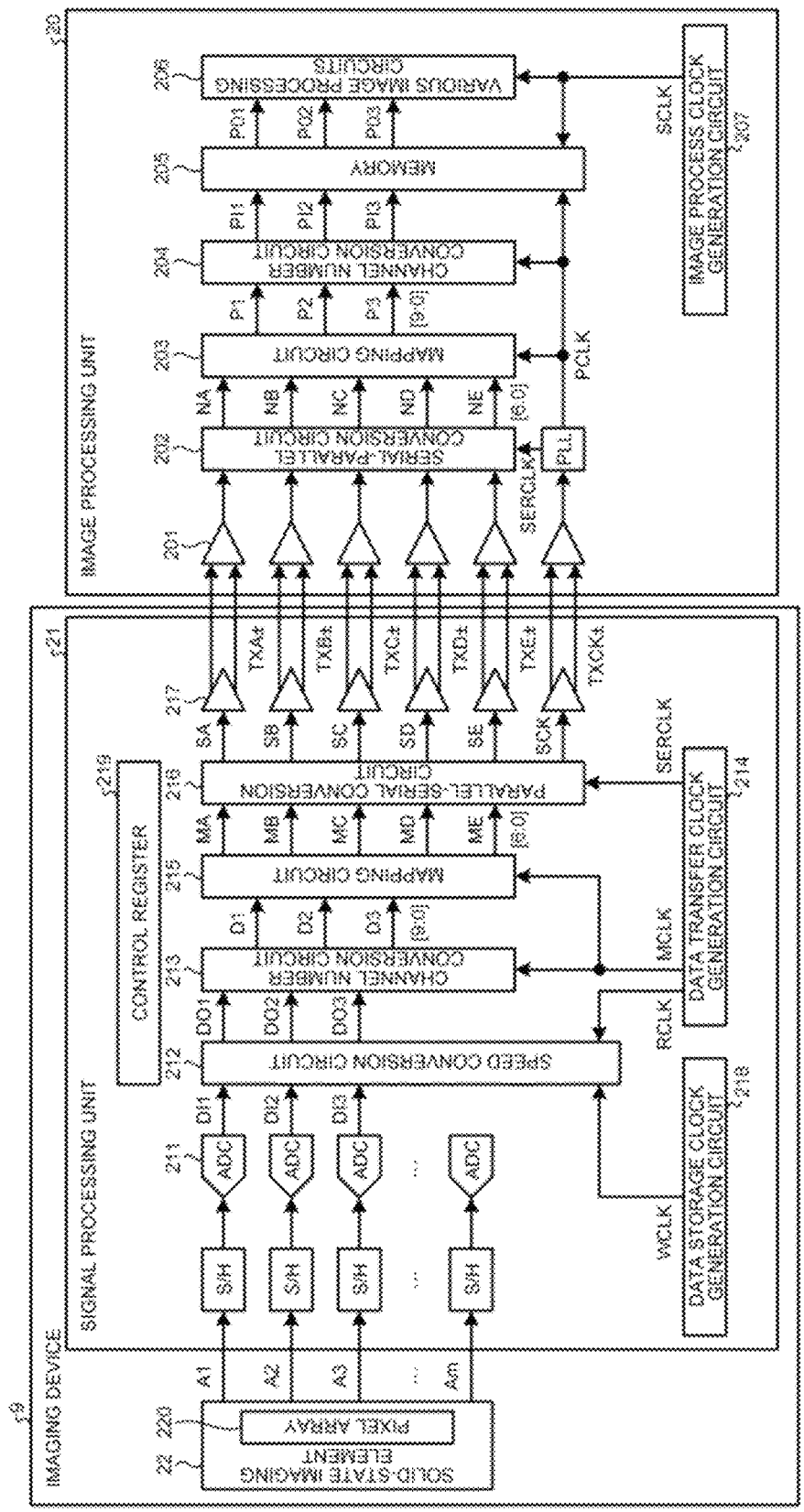
FIG. 8 is a diagram illustrating a circuit structure example of the signal processing unit and the image processing unit in the image reading device according to a second embodiment.

FIG. 8 is a diagram illustrating a circuit structure example of the signal processing unit 21 and the image processing unit 20 in the image reading device 101 according to the second embodiment.

As illustrated in FIG. 8, in a case where the signal processing unit 21 that can process the image data for m channels (for example, four channels) requires just the image data for n channels (for example, three channels), the writing in the speed conversion circuit 212 is restricted only to the image data for n channels, not the entire m channels.

Specifically, the signal processing unit 21 in the image reading device 101 stores, in the speed conversion circuit 212, just the digital data about the n channels that are less than or equal to the m channels selected from the digital data of the m channels that is input to the speed conversion circuit 212.

By acquiring the image data while reducing the number of channels in this manner, the access to (writing in) the speed conversion circuit 212 can be reduced. Thus, the number of writing accesses to the speed conversion circuit 212 can be reduced and the consumption power can be reduced.

Third Embodiment

Next, a third embodiment is described.

The signal processing unit 21 in the image reading device 101 according to the third embodiment is different from that in the first embodiment in that the number of channels for reading from the speed conversion circuit 212 is restricted. In the third embodiment, the description of the same part as in the first embodiment is omitted and the point different from the first embodiment is described.

Figure 9:
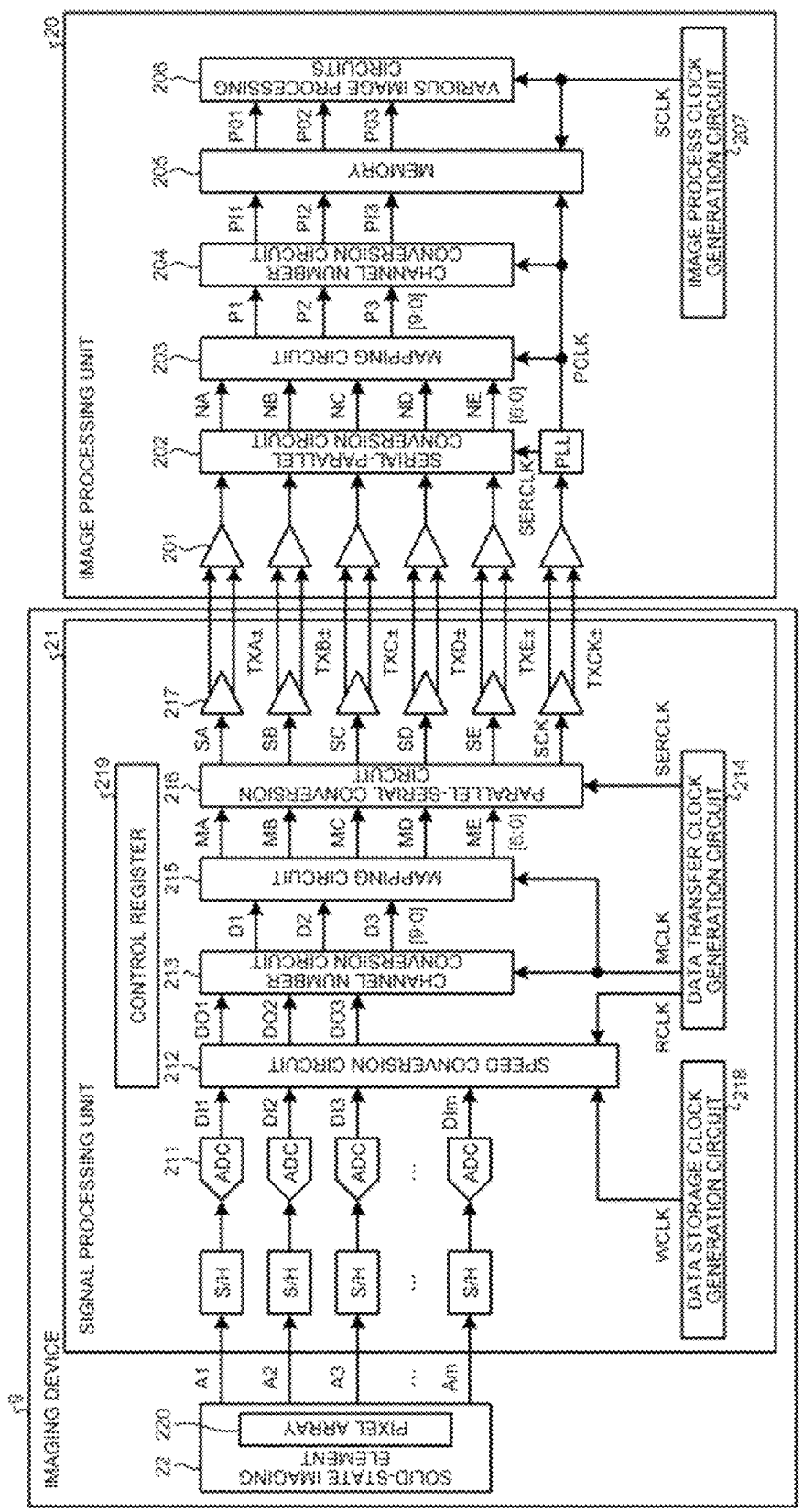
FIG. 9 is a diagram illustrating a circuit structure example of the signal processing unit and the image processing unit in the image reading device according to a third embodiment.

FIG. 9 is a diagram illustrating a circuit structure example of the signal processing unit 21 and the image processing unit 20 in the image reading device 101 according to the third embodiment.

As illustrated in FIG. 9, in a case where the signal processing unit 21 that can process the image data for m channels (for example, four channels) requires just the image data for n channels (for example, three channels), the reading from the speed conversion circuit 212 is restricted only to the image data for n channels, not the entire m channels.

Specifically, the signal processing unit 21 in the image reading device 101 reads out just the digital data about the n channels that are less than or equal to the m channels selected from the digital data of the m channels that is stored in the speed conversion circuit 212.

By acquiring the image data while reducing the number of channels in this manner, the access to (readout from) the speed conversion circuit 212 can be reduced. Thus, the number of reading accesses from the speed conversion circuit 212 can be reduced and the consumption power can be reduced.

Fourth Embodiment

Next, a fourth embodiment is described.

The signal processing unit 21 in the image reading device 101 according to the fourth embodiment is different from that in the first embodiment to the third embodiment in that the data is selected and output sequentially in each channel for each pixel in every channel as the data for n channels (for example, three channels) that is transferred per MCLK clock. In the description of the fourth embodiment, the description of the same parts as those of the first embodiment to the third embodiment is omitted and the point different from the first embodiment to the third embodiment is described.

Figure 10:
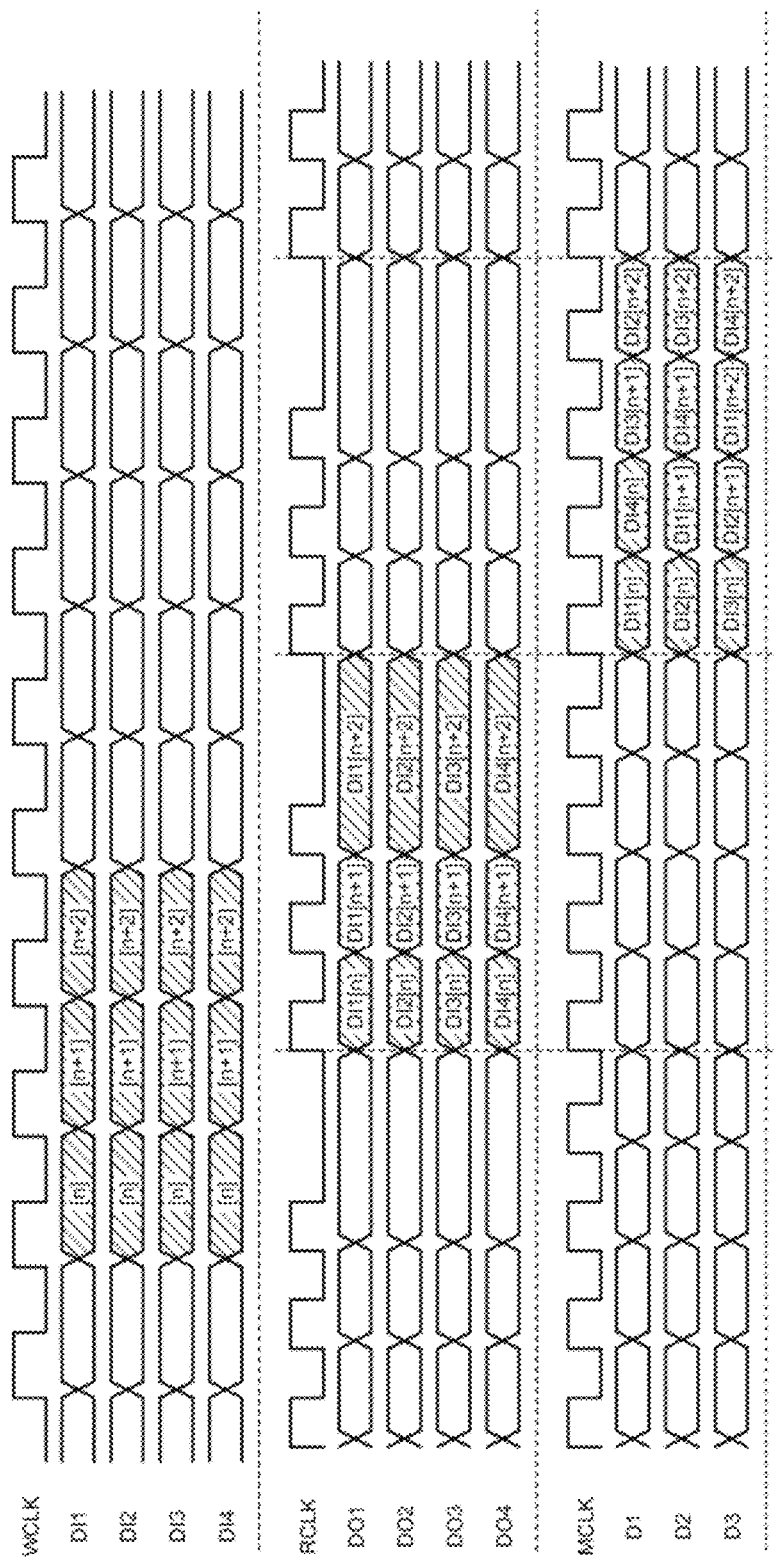
FIG. 10 is a timing chart illustrating one example of the data process in the signal processing unit according to
FIG. 11 is a timing chart illustrating one example of the data process in the signal processing unit according to a fifth embodiment.

FIG. 10 is a timing chart illustrating one example of the data process in the signal processing unit 21 according to the fourth embodiment. In the example illustrated in FIG. 10 in which the image data for four channels is converted into three channels, the data is selected and output sequentially for each pixel in every one of the m channels as the data for three channels that is transferred per MCLK clock. More specifically, in one MCLK clock period, for example, the data is transferred in the order of (channel 1, channel 2, channel 3), (channel 4, channel 1, channel 2), (channel 3, channel 4, channel 1), and (channel 2, channel 3, channel 4). In all the data transfer periods, the data to transfer is selected while the invalid image data is not transferred. Thus, in the entire clocks, the invalid pixel data is not multiplied and therefore, all the data can be transferred with the minimum clocks. Note that in the case of transferring the data for two pixels in one MCLK clock, the loss for one pixel occurs in every clock.

Fifth Embodiment

Next, a fifth embodiment is described.

The signal processing unit 21 in the image reading device 101 according to the fifth embodiment is different from that in the first embodiment to the fourth embodiment in that the number of channels for writing in the speed conversion circuit 212 is smaller than the number of channels for reading from the speed conversion circuit 212. In the description of the fifth embodiment, the description of the same parts as those of the first embodiment to the fourth embodiment is omitted and the point different from the first embodiment to the fourth embodiment is described.

Figure 11:
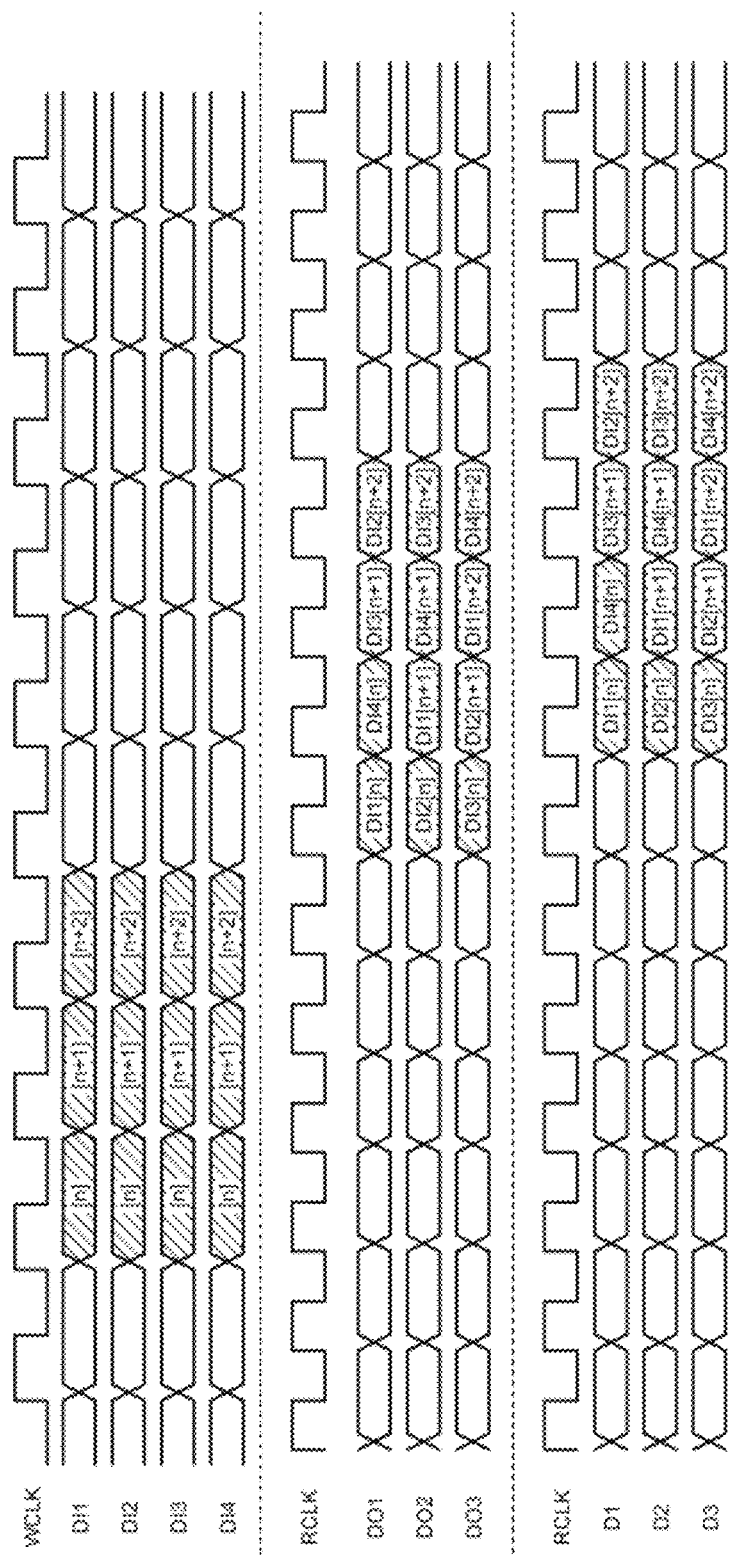

FIG. 11 is a timing chart illustrating one example of the data process in the signal processing unit 21 according to the fifth embodiment. In the first embodiment, etc., the writing in the speed conversion circuit 212 and the reading from the speed conversion circuit 212 are performed by the same number of channels. In the present embodiment, the number of channels for reading from the speed conversion circuit 212 (for example, three channels) is smaller than the number of channels for writing in the speed conversion circuit 212 (for example, four channels) as illustrated in FIG. 11.

In the structure of the present embodiment, RCLK for reading the speed conversion circuit and MCLK for transferring the data are also the same clock.

In this structure, by the readout control for the speed conversion circuit 212, for example, the image data for four channels is written at one time and at the readout, the data storage address in which the data is written is designated so that the image data for three channels can be read out. Thus, the readout from the speed conversion circuit and the channel number conversion can be performed at the same time. In this case, the channel number conversion after the readout from the speed conversion circuit is unnecessary.

Sixth Embodiment

Next, a sixth embodiment is described.

The image processing unit 20 according to the sixth embodiment is different from that in the first embodiment to the fifth embodiment in that the pixel array 220 and the signal processing unit 21 are provided as one element of the solid-state imaging element 22. In the description of the sixth embodiment, the description of the same parts as those of the first embodiment to the fifth embodiment is omitted and the point different from the first embodiment to the fifth embodiment is described.

Figure 12:
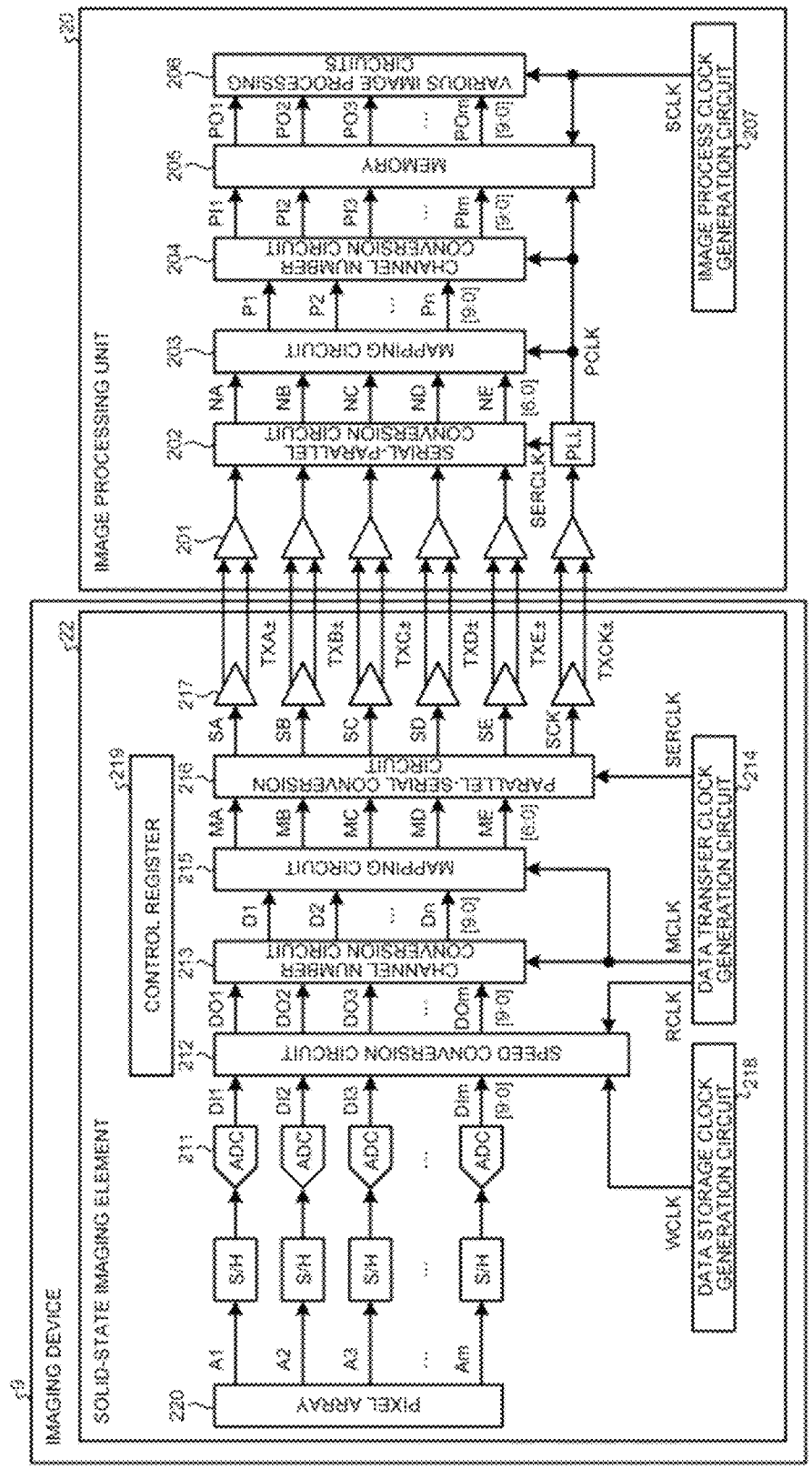
FIG. 12 is a diagram illustrating a circuit structure example of the signal processing unit and the image processing unit in the image reading device according to a sixth embodiment.

FIG. 12 is a diagram illustrating a circuit structure example of the image reading device 101 according to the sixth embodiment. As illustrated in FIG. 12, in the image reading device 101, the imaging device 9 includes the pixel array 220 and the signal processing unit 21 as one element of the solid-state imaging element 22.

In this manner, the pixel array 220 that converts the input light into the electric signals and the signal processing unit 21 that converts the output signal of the pixel array 220 into the digital data are made into one chip as the solid-state imaging element 22. Thus, the wiring on the board that connects the pixel array 220 and the signal processing unit 21 or the circuit used to exchange the signals become unnecessary. In particular, in the image reading device 101 that acquires the image data at high speed, the signals that control the pixel array 220 and the signal processing unit 21 also need to be operated at high speed, and the board needs to have the layout in consideration of the crosstalk of the control signals on the board and the like. By forming one chip as described in the present embodiment, the restriction at the layout on the board is reduced.

The embodiments of the present invention have been described and the specific structure of the components, the contents of the processes, and the data formats in these embodiments are not limited to those described in the embodiments.

The structures of the embodiments described above can be carried out in combination with each other as appropriate unless contradicting each other.

According to an embodiment, the occurrence of the restriction in mounting the ICs can be suppressed at low cost.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc. Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

REFERENCE SIGNS LIST

2 Light source
9 Imaging device
21 Signal processing device
22 Solid-state imaging element
212 Speed converting unit, data writing unit
213 Channel number converting unit
215, 216, 217 Serial data transferring unit
100 Image forming device
101 Reading device
103 Image forming unit

What is claimed is:

1. A signal processing device, comprising:
a data writing circuit configured to write data of m channels into a memory, each of the m channels corresponding to one of m colors;
a channel number converting circuit configured to output the data read from the memory as data of n channels, wherein m is variable and larger than n and n is constant;
a plurality of serial data transferring circuits configured to transfer the data of the n channels to a processing device in a subsequent stage; and
a speed converting circuit configured to convert a data reading speed from the memory to be larger than a data writing speed into the memory, wherein
the channel number converting circuit is configured to convert the data of the m channels into the data of n channels, the data reading speed of the data of the m channels being made larger by the speed converting circuit, and
the speed converting circuit is configured to convert a frequency of reading the data from the memory to be equal to or more than m/n times a frequency of writing the data into the memory.

2. The signal processing device according to claim 1, wherein the speed converting circuit includes a circuit configured to generate a clock for writing the data into the memory, and a circuit configured to generate a clock for reading the data from the memory.

3. The signal processing device according to claim 1, wherein the speed converting circuit is configured to convert the frequency of reading the data from the memory to be equal to m/n times the frequency of writing the data into the memory.

4. The signal processing device according to claim 1, wherein the speed converting circuit is configured to, even when converting data of different numbers of channels m1 and m2 as the data of them channels into the data of the n channels, control frequencies of reading the data from the memory to be the same.

5. The signal processing device according to claim 1, wherein the speed converting circuit is configured to read only the data of the n channels selected in advance from the data of the m channels written into the memory when only the data of the n channels is required.

6. The signal processing device according to claim 1, wherein the channel number converting circuit is configured to cause convert the data of the n channels transferred per reference clock to be n data obtained from one desired channel among the data of m channels.

7. The signal processing device according to claim 1, wherein the channel number converting circuit is configured to select the data of the n channels transferred per reference clock, one by one from each of the m channels in order.

8. An imaging device comprising a solid-state imaging element including:
a pixel array; and
the signal processing device according to claim 1, data read by the pixel array being input to the signal processing device.

9. A reading device comprising:
a light source configured to emit light; and
the imaging device according to claim 8, the imaging device being configured to receive reflection light of the light emitted from the light source.

10. An image forming device comprising:
the reading device according to claim 9; and
an image former.

11. A signal processing device, comprising:
a data writing circuit configured to write data of m channels into a memory, each of the m channels corresponding to one of m colors;
a channel number converting circuit configured to output the data read from the memory as data of n channels, m being larger than n; and
a plurality of serial data transferring circuits configured to transfer the data of the n channels to a processing device in a subsequent stage, wherein
the data writing circuit is configured to write only the data of the n channels among the data of the m channels into the memory when only the data of the n channels are required.

12. A signal processing method performed in a signal processing device, the signal processing method comprising:
writing data of m channels into a memory, each of the m channels corresponding to one of m colors;
transferring the data of the m channels read from the memory to a processing device in a subsequent stage as a plurality of serial signals of n channels, wherein m is variable and larger than n and n is constant;
converting a data reading speed from the memory to be larger than a data writing speed into the memory;
converting the data of the m channels into the data of n channels, the data reading speed of the data of the m channels being made larger; and converting a frequency of reading the data from the memory to be equal to or more than m/n times a frequency of writing the data into the memory.

* * * * *